(12) United States Patent
Cote

(10) Patent No.: US 12,360,945 B2
(45) Date of Patent: *Jul. 15, 2025

(54) SYSTEM AND METHOD FOR PROVIDING A CONTAINER ENVIRONMENT IN A SINGLE FILE

(71) Applicant: Sylabs Inc., Reno, NV (US)

(72) Inventor: Yannick Cote, Santa Clara, CA (US)

(73) Assignee: Sylabs Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,963

(22) Filed: May 1, 2023

(65) Prior Publication Data

US 2024/0004832 A1 Jan. 4, 2024

Related U.S. Application Data

(63) Continuation of application No. 16/435,251, filed on Jun. 7, 2019, now Pat. No. 11,640,372.

(60) Provisional application No. 62/683,796, filed on Jun. 12, 2018.

(51) Int. Cl.
*G06F 16/13* (2019.01)
*G06F 16/11* (2019.01)
*H04L 9/06* (2006.01)

(52) U.S. Cl.
CPC ............ *G06F 16/13* (2019.01); *G06F 16/116* (2019.01); *H04L 9/0643* (2013.01)

(58) Field of Classification Search
CPC ...... G06F 16/13; G06F 16/116; G06F 16/188; H04L 9/0643; H04L 9/0891; H04L 9/0894; H04L 9/3255

USPC ......................................................... 707/756
See application file for complete search history.

(56) References Cited

U.S. PATENT DOCUMENTS

| | | | |
|---|---|---|---|
| 6,079,047 A * | 6/2000 | Cotugno | G06F 16/116 714/799 |
| 6,678,700 B1 * | 1/2004 | Moore | G06F 16/256 |
| 7,577,848 B2 * | 8/2009 | Schwartz | G06F 21/64 713/168 |
| 7,962,689 B1 * | 6/2011 | Kazar | G06F 3/0643 711/100 |
| 8,949,614 B1 * | 2/2015 | Jernigan, IV | H04L 63/00 713/178 |
| 9,147,291 B2 * | 9/2015 | Xu | G06T 19/006 |
| 9,262,423 B2 * | 2/2016 | Borshack | G06F 16/137 |
| 9,569,443 B1 * | 2/2017 | van Rietschote | G06F 16/116 |
| 9,594,514 B1 * | 3/2017 | Bono | G06F 3/0679 |
| 9,940,331 B1 * | 4/2018 | Bono | G06F 16/128 |
| 10,078,451 B1 * | 9/2018 | Floyd | G06F 3/0631 |
| 10,146,703 B1 * | 12/2018 | Bono | G06F 3/064 |
| 10,157,184 B2 * | 12/2018 | Liu | G06F 16/116 |

(Continued)

OTHER PUBLICATIONS

Bauer, Michael, "Singularity Containers," CernVM Users Workshop, Jan. 31, 2018 [Retrieved on Oct. 16, 2021], Retrieved from https://indico.cern.ch/event/608592/contributions/2830120/attachments/1592403/2520972/CernVM_Workshop.pdf.

(Continued)

*Primary Examiner* — Sheree N Brown
(74) *Attorney, Agent, or Firm* — KOKKA & BACKUS, PC

(57) ABSTRACT

Systems and apparatus for implementation and management of a singularity image format file in a computer system and methods for making and using the same. In various embodiment, these technologies are used to facilitate storage of all data related to a container in a single file among other things.

20 Claims, 3 Drawing Sheets

(56) References Cited

U.S. PATENT DOCUMENTS

| | | | | |
|---|---|---|---|---|
| 10,467,003 | B1* | 11/2019 | Mendonca | G06F 8/60 |
| 10,650,158 | B2* | 5/2020 | Capone | G06F 16/13 |
| 10,936,549 | B2* | 3/2021 | Cherukuri | G06F 16/25 |
| 11,449,468 | B1* | 9/2022 | Yu | G06F 16/184 |
| 11,593,217 | B2* | 2/2023 | Kottomtharayil | G06F 11/1464 |
| 11,640,372 | B2 | 5/2023 | Cote | |
| 2006/0161761 | A1* | 7/2006 | Schwartz | G06F 21/64 |
| | | | | 711/216 |
| 2006/0294115 | A1* | 12/2006 | Armangau | G06F 16/13 |
| 2006/0294163 | A1* | 12/2006 | Armangau | G06F 16/13 |
| 2008/0270461 | A1* | 10/2008 | Gordon | G06F 3/0608 |
| 2009/0112870 | A1* | 4/2009 | Ozzie | G06F 16/184 |
| | | | | 707/999.009 |
| 2009/0271418 | A1* | 10/2009 | Vaghani | G06F 11/1435 |
| | | | | 707/E17.05 |
| 2013/0218930 | A1* | 8/2013 | Wood | G06F 16/13 |
| | | | | 707/E17.019 |
| 2013/0262410 | A1* | 10/2013 | Liu | G06F 16/116 |
| | | | | 707/693 |
| 2013/0278634 | A1* | 10/2013 | Xu | G06T 19/006 |
| | | | | 345/633 |
| 2014/0358925 | A1* | 12/2014 | Jakobowski | H04L 67/02 |
| | | | | 707/737 |
| 2015/0023612 | A1* | 1/2015 | Thakkar | H04N 21/23424 |
| | | | | 382/305 |
| 2016/0110258 | A1* | 4/2016 | Haustein | G06F 16/00 |
| | | | | 707/646 |
| 2016/0210308 | A1* | 7/2016 | Shekhar | G06F 3/0619 |
| 2017/0255462 | A1 | 9/2017 | Azagury et al. | |
| 2017/0277524 | A1 | 9/2017 | Bhat et al. | |
| 2018/0004766 | A1* | 1/2018 | Darling | G06F 16/164 |
| 2018/0157521 | A1* | 6/2018 | Arikatla | G06F 9/45558 |
| 2018/0157522 | A1* | 6/2018 | Bafna | G06F 16/182 |
| 2018/0157561 | A1* | 6/2018 | Venkatesh | G06F 11/2043 |
| 2018/0157677 | A1* | 6/2018 | Bafna | G06F 16/188 |
| 2018/0157752 | A1* | 6/2018 | Arikatla | G06F 16/182 |
| 2018/0267990 | A1* | 9/2018 | Cherukuri | G06F 8/60 |
| 2019/0318107 | A1* | 10/2019 | Capone | G06F 21/6218 |
| 2019/0377708 | A1* | 12/2019 | Cote | H04L 9/0894 |

OTHER PUBLICATIONS

Brown, Sheree N., Final Office Action mailed Jan. 7, 2022 for U.S. Appl. No. 16/435,251.

Brown, Sheree N., Non-Final Office Action mailed Aug. 31, 2022 for U.S. Appl. No. 16/435,251.

Brown, Sheree N., Non-Final Office Action mailed May 13, 2021 for U.S. Appl. No. 16/435,251.

Brown, Sheree N., Notice of Allowance and Fee(s) Due mailed Jan. 5, 2023 for U.S. Appl. No. 16/435,251.

Byun, Sung Cheal, International Search Report and Written Opinion of the International Searching Authority for International Application No. PCT/US2019/036089 (Sep. 26, 2019).

Kurtzer et al., "Singularity: Scientific containers for mobility of compute," PLOS One, May 11, 2017 [Retrieved on Oct. 16, 2021], Retrieved from https://journals.plos.org/plosone/article?id=10.1371/journal.pone.0177459.

Kurtzer, Gregory M., "About Singularity," Retrieved from Internet: https://web.archive.org/web/20171231202503/http://singularity.lbl.gov:80/about, Oct. 12, 2017 (Year: 2017).

Preney, Paul, "Singularity," School of Computer Science, University of Windsor, Feb. 14, 2018 [Retrieved on Oct. 16, 2021], Retrieved from https://www.sharcnet.ca/help/images/e/ef/2018-02-14-SHARCNET-singularity-webinar.pdf.

\* cited by examiner

SYSTEM AND METHOD FOR PROVIDING A CONTAINER ENVIRONMENT IN A SINGLE FILE

CROSS-REFERENCE TO APPLICATIONS

This application is a continuation application of copending U.S. patent application Ser. No. 16/435,251, filed Jun. 7, 2019 and titled, "SYSTEM AND METHOD FOR PROVIDING A CONTAINER ENVIRONMENT IN A SINGLE FILE," U.S. patent application Ser. No. 16/435,251 claims the benefit of U.S. Provisional Patent Application No. 62/683,796, filed Jun. 12, 2018 and titled, "SINGULARITY IMAGE FORMAT SYSTEM AND METHOD," all of which are herein incorporated by reference in their entirety for all purposes.

FIELD

The present disclosure relates generally to digital data processing and more particularly, but not exclusively, to systems and methods for providing a Singularity image format file for storing all data related to a container (or a container environment) in a single file.

BACKGROUND

In typical conventional computer container systems, a directory of files is used as root file system for a running container. These conventional computer container systems thus require root permissions to run and do not permit the container file system to be stored in a single file. Furthermore, conventional container image files hold only a single data region. This data region is the file system binary image file. In other words, the container image file equals the file system image file plus a prepended shell execution string making possible the execution of the container on the command line like a program In view of the foregoing, a need exists for an improved image file format system and method for storing all data related to a container in a single file in an effort to overcome the aforementioned obstacles and deficiencies of conventional computer systems.

Figure 1:
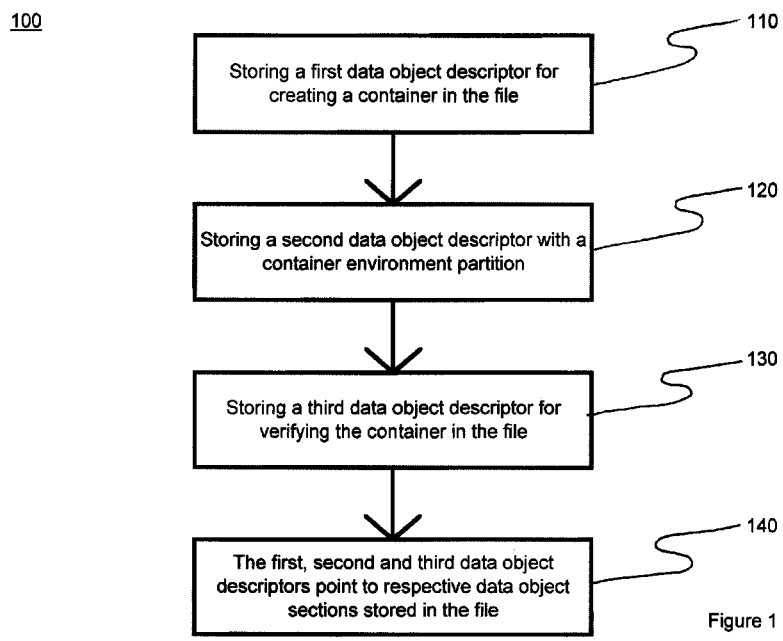
FIG. 1 is an exemplary top-level flow chart illustrating an embodiment of a method for providing a container environment in a single container file.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available container files can hold only a single data region, a system and method for storing all data related to a container in a single file can prove desirable and provide a basis for a wide range of computer and server system applications. This result can be achieved, according to one embodiment disclosed herein, by a method 100 for storing all data related to a container in a single container file as illustrated in FIG. 1.

Turning to FIG. 1, the method 100 for providing a container environment in a single container file can include, at 110, storing a first data object descriptor for creating a container in the file. At 120, a second data object descriptor with a container environment partition can be stored in the same file. The method 100 can further include storing a third data object descriptor for verifying the container in the file, at 130. The first, second and third data object descriptors, at 140, can point to respective data object sections stored in the file.

Figure 2:
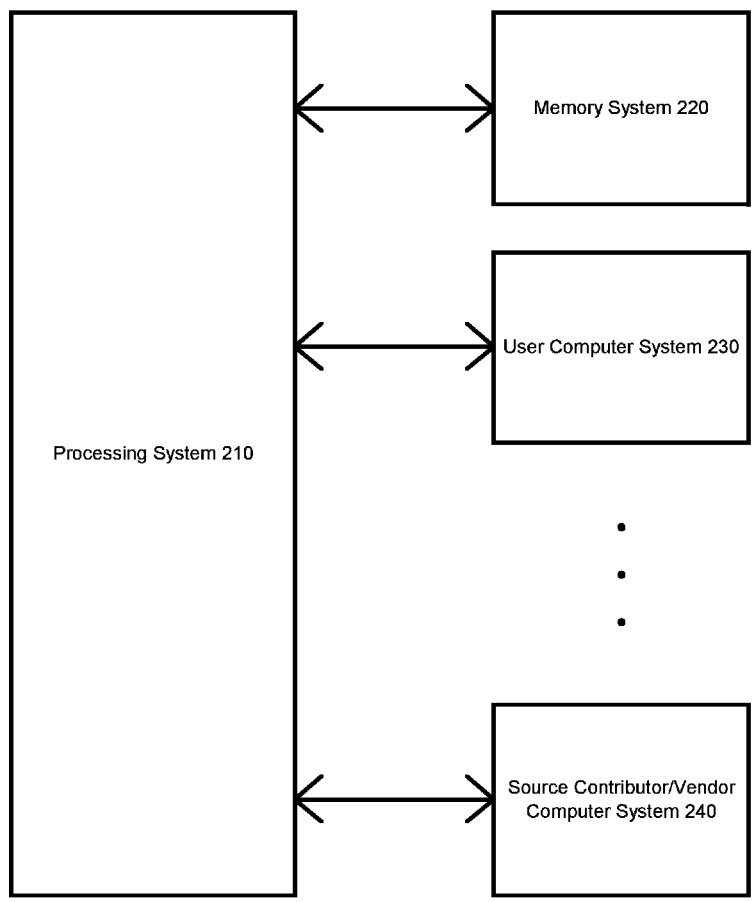
FIG. 2 is an exemplary top-level block diagram illustrating an embodiment of a system for executing the method of FIG. 1.

An exemplary container environment system 200 for executing the method 100 is shown in FIG. 2. The container environment system 200 is shown as including a central processing system 210 for executing the container. The container environment in the single container file can be stored and made available to the central processing system 210 via a memory system 220. The container environment system 200 can communicate with the plurality of computing platforms and other computing systems. For example, the container environment system 200 can enable users to access the container via respective user computer systems 230 and/or enable source contributors and vendors to collaborate and submit new data object formats and other files via respective source contributor/vendor computer systems 240.

Figure 3:
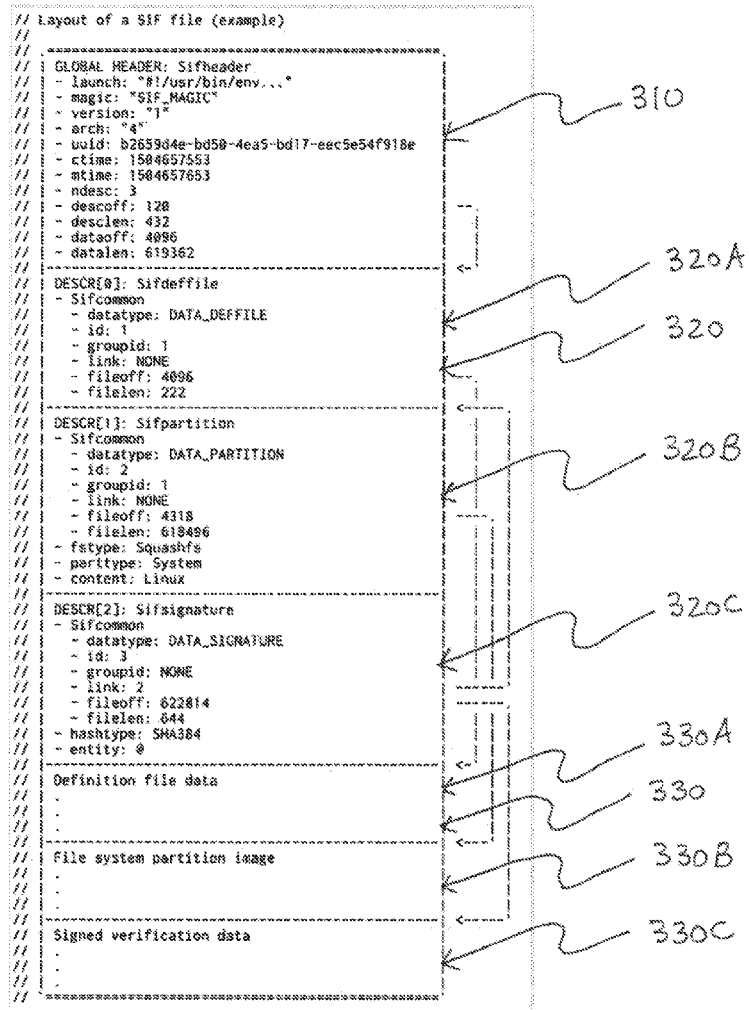
FIG. 3 is an exemplary top-level drawing illustrating an embodiment of a layout of a Singularity Image Format file.

In selected embodiments, the method 100 can store all of the data related to the container in a Singularity Image Format (SIF) file 300 (shown in FIG. 3). Use of the SIF file 300 advantageously can help facilitate storing all of the data related to the container in the single file. The SIF file 300, for example, can allow independent regions of data to be stored in a side by side manner inside the single file and/or can include a mechanism to independently store and/or retrieve the data at file creation time or later, for example, as runtime modifications. Additionally and/or alternatively, the SIF file 300 can include a mechanism for establishing relationships between data regions. The data regions thereby can point to one or more other data regions and/or data region groups. The established relationships advantageously can be utilized for identifying data describing other data regions and/or for signature blocks for verifying one data region and/or a group of data regions.

In one embodiment, an exemplary SIF file can include a global header. The global header preferably starts the SIF file and/or can be used for identifying a file type and other general information about the SIF file. The general file information can include, for example, a time of creation, an architecture, a unique identifier and/or a number of data object descriptors that the SIF file holds. The SIF file can include a second block of data that can be composed of one or more data object descriptors. The data object descriptors can hold information about data regions making up the SIF file. The data object descriptors, for example, can point to a starting point and/or an ending point for one or more selected data regions. In selected embodiments, the data object descriptors can point to starting points and/or ending points for each of the data regions. Additionally and/or alternatively, the SIF file can include a third block of data in which the actual data regions live. In one embodiment, the third block of data can be provided toward an end region of the SIF file. The data regions can, for example, hold definition files (or recipes) used to create the container, a file system binary image, a verification hash and/or a signature of the data and other optional meta-data and container related data.

Advantageously, the nature of the SIF file, by storing the whole container environment inside a single file, enables several useful features since Singularity has adopted the concept. Set forth herein, the SIF file can have an ability to create and/or sign a container in combination with an ability to verify the container before running the container. A container stored in a SIF file can be, but preferably is not, an archive of a container. Instead, the container can be an actual live format that can be accessed directly to read and/or write data objects. The container likewise can execute without transformation.

The SIF file preferably supports expansion of data object kind in mind where open source contributor and vendors may collaborate and submit new data object format akin to new kind of files to store in a file system. As described herein, different operating systems (OSs) may support sharing a single container file with the SIF file; however, the same OS compiled for different computer architecture may cohabitate in the same SIF file to run smoothly across a computer cluster of heterogeneous nodes (a cluster comprised of machine populated with central processing units (CPUs) of different architecture). The SIF file also can offer to store persistent data in separate data objects alongside read-only system partition(s) (container runtime environment) to better manage user created persistent data and an OS kept in a known state.

Turning to FIG. 3, an exemplary layout of one preferred embodiment of an illustrative SIF file 300 is shown. The SIF file can include the global header 310 and/or a plurality of data object descriptors 320 for pointing to respective data object sections 330 in the manner discussed above herein. A first data object descriptor 320A can include a container "recipe" for creating the container and can point to a first data object section 330A. A second data object descriptor 320B can include a container system partition and/or applications and can point to a second data object section 330B; while, a third data object descriptor 320C can hold a cryptographic signature of a verification hash for the second data object descriptor 320B (or a system partition) and can point to a third data object section 330C. Although shown and described has including three data object descriptors 320A-C with reference to FIG. 3 for purposes of illustration only, the SIF file can include any suitable predetermined number of data object descriptors 320, as desired.

The structure of the SIF file 300 shown in FIG. 3 can correspond with one or more Research UNIX® file system patterns. A first element found at the beginning of the Research UNIX® file system patterns can be the boot block, which may contain executable code to kick start the execution of an operating system located on that file system. A first element of the SIF file 300 can be a "hashbang" line to execute a container workflow. The next element can be a super block, or the global header 310, in the SIF file 300. The global header 310 can define the type of file system and some global offsets and/or space amounts for a file system, and the SIF file 300 optionally can use the global header 310 to describe various meta-data for the container file and/or offsets to object descriptors 320. The object descriptors 320 can follow the global header 310 and act as inodes in file systems. A selected file system, for example, can have several blocks of data for the files that can be contained within the file system. In selected embodiments, the SIF file 300 can store data in blocks following the object descriptors 320.

An advantage of having the SIF file 300 following a design of a simple file system lies in the flexibility of being able to either access data via a library understanding the format or via the mapping of a SIF file as a user mode filesystem using technologies such as Filesystem in Userspace (FUSE) giving programs the ability to access the different sections of SIF-like regular files in an hierarchical structure with directories.

Regardless of the interface used to access a SIF file, tools to create and/or modify SIF files can comprises a part of the reference implementation. Exemplary primitives can be used to create a new SIF file, list sections, inspect section meta-data, dump sections to file, add sections (modify), remove sections (modify), sign and/or verify data sections.

A selected object descriptor 320 can include one or more of the following fields: id; group id; and link. Each object descriptor 320 can have a unique id number to help handle a specific data object. Data objects can be part of a group. A group can be defined using numerical ids. Many data objects may be related and combined, for example, by having their group field set to the same value. Data object descriptors may indicate their relationship to another data object descriptor or a group of data object descriptors via the link field. For instance, a signature block can have the id for which it has a signature for into its link field. This allows the signature data object descriptor to point to either a unique descriptor or a group of descriptors. This notion of relationship between different sections of data can be powerful and/or can allow for more sophisticated features to be built around the concept, as demonstrated with the signing ability.

When a SIF file is loaded and/or validated, a number of descriptors can be extracted from the global header 310 and an offset specifies where data object descriptors 320 start in the file. In some embodiments, the data object descriptors 320 can follow the global header 310 and align conveniently for better performance on the architecture upon which the SIF file is being executed. The SIF library can jump to a first descriptor and/or parse each descriptor in turn to identify the kind of data present in the SIF file and determine what the workflow is going to be. Each container should have one system partition where an operating system lies and from which the applications should run. Other kinds of object descriptors can be defined to store data such as JavaScript Object Notation (JSON) meta-data for the container, Singularity recipes describing how the system partition was created among other things, signature blocks and vendor specific objects.

After the descriptors have been loaded and data from the container has been identified, Singularity in combination with the SIF library can prepare the container workflow and runtime environment. In one embodiment, Singularity can have a system partition that can be read-only and separate the writable data section into a separate data object. That decoupling can be useful to retain a verifiable system partition that does not change while persisting data created by running container workflows that the user need to preserve. Although shown and described with reference to FIG. 3 as being a C language and a Golang implementation for purposes of illustration only, the SIF file can be written and/or implemented in any computer language and/or implementation. The C language and a Golang implementation of the SIF file advantageously can provide better portability and ease of use in different projects.

The SIF file can provide several advantages over conventional solutions. For example, Singularity containers comprise a single file from the moment that the containers can be created until the moment execution of the containers stops. No transformation preferably is applied between a time at which containers are copied in place for execution and their execution. This enables the notion of trusted containers because data can be cryptographically signed when the SIF file is created and verified before every execution for the entire lifetime of the container. No other current format allows for valid signature verification from the time of creation until the container ceases to exist. In general, signed archives in conventional systems must be unpacked into folders before execution which renders impossible cryptographic verification at runtime.

Furthermore, all data necessary to run the container lies within a file that can be directly accessible at all times by simple tools without having to move or modify data. The SIF file does not impose any data format, and a number of data objects stored can be limited only by the storage size where the file lies. For example, a single SIF file may host half a dozen of different Linux distributions each in its own system partition data object, and initialization determines which OS and environment to run at a specific moment. This can be possible because the SIF file holds data objects that drive the orchestration of container execution. Also, because of the feature allowing relationships to be establish between descriptors or groups of descriptors and because of the ability to also point to descriptors or groups, complete sets of container data may coexist within a single SIF file. Another example of this feature would be how two different system partitions may execute in turn but both using the same writable data object to persist runtime data.

Since a SIF file can model a traditional file system, it can be possible to map a SIF image file into a real file system. One way to create this mapping can be by using the FUSE module to create a user mode file system. Thereafter, accessing any SIF data object can comprise reading and writing a file in the file system. Creating files and deleting files would create and remove data sections from the SIF image and finally the list operation (ls) would list all the files (data object descriptors) of the SIF image.

The use of the SIF file advantageously can enable faster access to container meta-data. Additionally and/or alternatively, the SIF file advantageously can support multiple system partitions, checkpoint restart with no external data, architecture auto-detection and system selection at runtime and/or general JSON meta-data objects searchable by application/vendor type. The SIF format likewise can allow a great amount of flexibility and can evolve by adding new data objects as time go by without disturbing or otherwise changing data previously stored.

Since the SIF file can be viewed as a File System for containers, new kind of data (data object descriptors) may be created by third parties and stored within a SIF file, promoting collaboration from the open source community and also from vendors interested in storing runtime specific data, such as monitoring results, benchmarks, etc., or to define new workflows. The SIF file thereby can help further discovery of sophistication in containers.

Although various implementations are discussed herein and shown in the figures, it will be understood that the principles described herein are not limited to such. Accordingly, persons of ordinary skill in the art will understand that, although particular embodiments have been illustrated and described, the principles described herein can be applied to different types of computer systems. Certain embodiments have been described for the purpose of simplifying the description, and it will be understood to persons skilled in the art that this is illustrative only. It will also be understood that reference to a "server," "computer systems" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

The invention claimed is:

1. An apparatus comprising:
  a memory including executable instructions; and
  a processor, responsive to executing the instructions, is configured to execute a method for providing a container environment in a single container file, the method comprising:
  storing a first data object descriptor for creating a container in the single container file, the first data object descriptor configured to point to a first data region in the single container file;
  storing a second data object descriptor with a container environment partition in the single container file, the second data object descriptor configured to point to a second data region in the single container file;
  storing a third data object descriptor for verifying the container in the single container file, the third data object descriptor configured to point to a third data region in the single container file,
  wherein the first, second and third data object descriptors point to respective data object sections stored in the single container file based on offset data referencing locations within the single container file;
  configuring one or more data regions in the single container file to store a definition file configured to create the single container file, a file system binary image, a verification hash, a data signature, and metadata associated with the single container file, the single container file being mapped to a user mode file system using a FUSE module, the user mode file system being used to map a file of a hierarchical data structure to a section of the single container file, an operation being performed on data in the section of the single container file when the file in the hierarchical data structure is accessed; and
  including a hashbang line configured to execute a workflow associated with the container and the single container file,
  wherein the first, second and third data object descriptors are configured to point to sets of container data in the single container file to facilitate execution of multiple system partitions using a common writable data object to persist runtime data.

2. The apparatus of claim 1, wherein said storing the first data object descriptor, said storing the second data object descriptor and said storing the third data object descriptor comprise storing the first, second and third data object descriptors in one Singularity Image Format (SIF) file.

3. The apparatus of claim 1, wherein said storing the first data object descriptor includes storing the first data object descriptor for signing the container.

4. The apparatus of claim 1, further comprising executing the container.

5. The apparatus of claim 4, wherein said executing the container includes executing at least one data object in file to create the container.

6. The apparatus of claim 4, further comprising verifying the container via the third data object descriptor before said executing the container.

7. The apparatus of claim 6, wherein said verifying the container includes utilizing a cryptographic signature of a verification has to verify the container.

8. The apparatus of claim 4, wherein said executing the container includes executing the container in a live format.

9. The apparatus of claim 8, wherein said executing the container in a live format includes enabling direct reading of data objects from the container file, enabling direct writing of data objects to the single container file or both.

10. The apparatus of claim 9, wherein said enabling the direct reading of the data objects includes enabling the data objects to be read from the single container file in an independent manner, or wherein said enabling the direct writing of the data objects includes enabling the data objects to be written to the single container file in an independent manner.

11. The apparatus of claim 9, wherein said enabling the direct reading of the data objects includes enabling the data objects to be read from the single container file at creation of the container, while the container is being executed or both, or wherein said enabling the direct writing of the data objects includes enabling the data objects to be written to the single container file at creation of the container, while the container is being executed or both.

12. The apparatus of claim 9, further comprising establishing relationships among the data objects.

13. The apparatus of claim 12, wherein said establishing the relationships among the data objects includes enabling a selected data object to point to one or more other data objects.

14. The apparatus of claim 8, wherein said executing the container in a live format includes executing the container without transforming the container.

15. The apparatus of claim 1, further comprising storing all files for a selected operating system in the single container file.

16. The apparatus of claim 15, further comprising enabling the selected operating system compiled for a plurality of different computing architectures to share the single container file or enabling a plurality of different operating systems to share the single container file.

17. The apparatus of claim 15, wherein the data object sections are accessible to the selected operating system.

18. The apparatus of claim 1, wherein the data object sections are stored in a hierarchical manner within the single container file or wherein the data object sections are stored in a side-by-side manner within the single container file.

19. The apparatus of claim 1, wherein the single container file includes a header for providing descriptive information about the single container file.

20. The apparatus of claim 19, wherein the descriptive information includes a file type of the single container file, a time of creation of the single container file, an architecture of the single container file, a unique identifier of the single container file, a number of data object descriptors held by of the single container file or a combination thereof.

* * * * *